Figure 1:
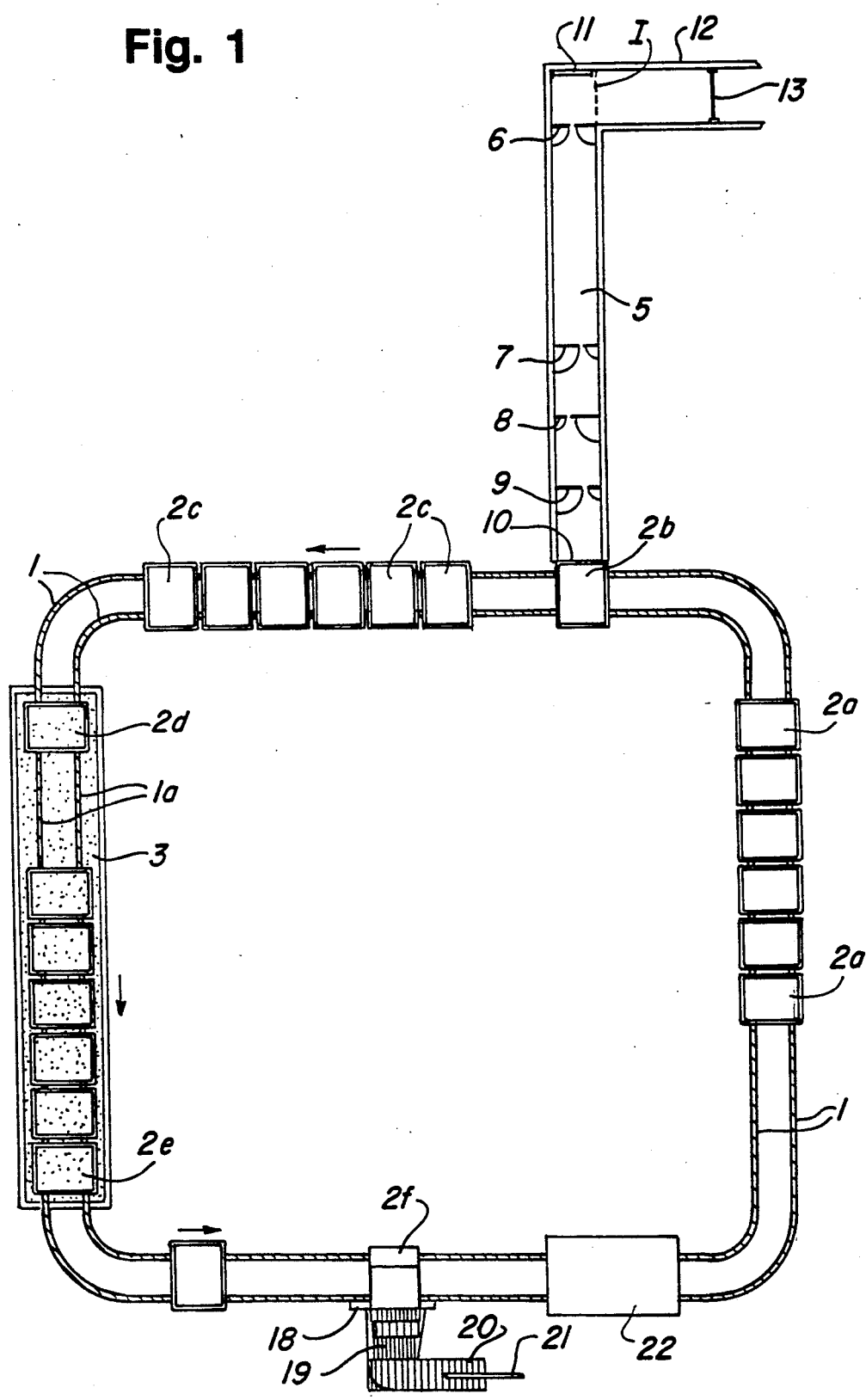

United States Patent [19]

Christensen et al.

[11] Patent Number: 5,186,677
[45] Date of Patent: Feb. 16, 1993

[54] PROCEDURE AND PLANT FOR THE STUNNING OF ANIMALS TO BE SLAUGHTERED AT SLAUGHTERHOUSES

[75] Inventors: Leif L. Christensen, Vaerloese; Tage W. Joergensen, Copenhagen S, both of Denmark; Claes-Henrik Hansen, Lund, Sweden

[73] Assignee: Slagteriernes Forskningsinstitut, Roskilde, Denmark

[21] Appl. No.: 652,560

[22] Filed: Feb. 7, 1991

[30] Foreign Application Priority Data

Feb. 8, 1990 [DK] Denmark .................... 334/90

[51] Int. Cl.$^5$ ............................ A22B 3/00; B61D 9/14
[52] U.S. Cl. ................................ 452/66; 452/57; 452/53
[58] Field of Search ................ 452/57, 58, 66, 53

[56] References Cited

U.S. PATENT DOCUMENTS

| | | | |
|---|---|---|---|
| 1,753,851 | 4/1930 | Dever | 452/57 |
| 3,838,396 | 8/1974 | Wernberg | 452/66 |
| 4,888,855 | 12/1989 | Haumann et al. | 452/66 |

FOREIGN PATENT DOCUMENTS

| | | |
|---|---|---|
| 440171 | 10/1971 | Denmark . |
| 126549 | 7/1973 | Denmark . |
| 280111 | 2/1988 | European Pat. Off. . |
| 8701791 | 7/1988 | Fed. Rep. of Germany . |
| 3835763 | 5/1989 | Fed. Rep. of Germany . |
| 3817103 | 11/1989 | Fed. Rep. of Germany . |
| 454342 | 4/1988 | Sweden . |

*Primary Examiner*—Willis Little

[57] ABSTRACT

Stunning of animals to be slaughtered at slaughterhouses takes place by exposing the animals for a sufficiently long period of time to an anaesthetic atmosphere, such as an atmosphere of carbon dioxide. A number of animals is first driven into a transport box (2b) which has been placed in a filling area at the slaughterhouse. Then a filled box is transported to a waiting area for boxes (2c), and from this waiting area a box is taken when needed and led through a stunning area (3) filled with the anaesthetic atmosphere, such as an oblong pit with room for 2-15 boxes (2d), which are led in one after another. The boxes (2f) with stunned animals are emptied of animals to be slaughtered, which are chained, whereas the empty boxes (2a) are returned to the filling area for renewed use. The removal of a box (2c) from the waiting area and the supply to the stunning area (3) are controlled by the current slaughtering speed and the number of boxes (2d) in the stunning area. The described method ensures an animal-friendly treatment of the animals and an optimum stunning, even if interruptions in the supply occur.

20 Claims, 6 Drawing Sheets

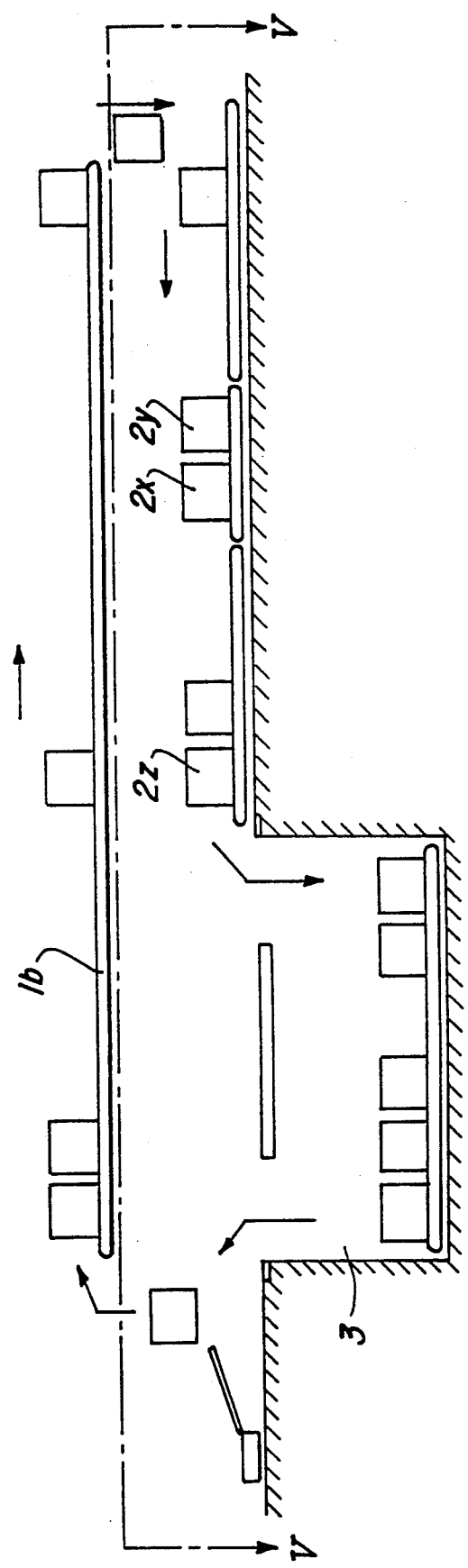

PROCEDURE AND PLANT FOR THE STUNNING OF ANIMALS TO BE SLAUGHTERED AT SLAUGHTERHOUSES

The present invention relates to a procedure for the stunning of animals to be slaughtered at slaughterhouses, by which the animals in boxes are led through a pit with an anaesthetic atmosphere after which the boxes with stunned animals are emptied and returned for renewed filling with animals to be slaughtered.

When pigs are being slaughtered at large slaughterhouses, the animals are driven from the pen area of the slaughterhouse into a driving corridor, in which they are arranged in a line and led to a stunning plant. This consists of a number of compartments which are conveyed in a forced way in a paternoster system. Such a system is described in DK-B 126.549. One or two animals from the corridor is/are admitted into a compartment through a door at one side of the plant, and the paternoster system is started, so that the compartment with the animals is led downwards to a pit which is filled with an atmosphere of carbon dioxide. When the following compartment is opposite the door, the system will be stopped and this compartment will be filled with one or two animals. Then the system is set in motion again, and in this way the compartments are being filled one by one.

A few seconds after the animals have entered the atmosphere of carbon dioxide they become unconscious, and when the paternoster system has led the compartment up to a discharge door, the animals are fully stunned. The stunned animals are automatically discharged from the compartment and they fall through the door opening on to a table. An operator sees that the animals are suspended, fastening a conveyor device to one hind leg of a stunned animal. An elevator lifts the conveyor device on to a horizontal conveyor, which leads the animal into the sticking area, in which the blood is collected from the stunned animal.

If the supply of animals is regular and constant, the stunning plant has a sufficiently high capacity to supply one or two slaughter lines at a modern slaughterhouse. However, problems may often arise getting the animals to move forward in the corridor and into the gondolas without the application of force, and therefore the animals will be put under stress by the situation they are brought into. As far as the protection of animals and the quality of meat are concerned, it is not fortunate that it may be necessary to force the animals forward in the corridor by means of electric currents from a hand device, since this increases the animals level of stress even more. From an economic point of view it is unfavourable that one or more operators should be occupied supervising and driving the animals, and they cannot always prevent temporary interruptions in supply anyway. These interruptions may be significant for the rest of the slaughter line.

When there is an interruption in the corridor, the effect would also be that the animals which have already been admitted into the stunning plant would be exposed to an unintentionally long stunning period, and therefore the process is not optimum.

When interruptions occur on the slaughter line, it will often be necessary also to stop the stunning plant, with the effect that the animals are also exposed to an extended stunning period, which may affect the quality of the meat. If, on the contrary, there is an increased need to supply the slaughter line with more carcasses, the operator has the possibility to increase the speed, but that would increase the risk of an animal not being sufficiently stunned before the sticking operation.

Therefore, the well-known paternoster system suffers from some deficiencies as far as animal protection, quality of meat and operation of the slaughterhouse are concerned, but until now no better system has been suggested which can be applied in practice in connection with the high slaughtering speed in large-scale slaughterhouses.

From SE-B 454.342 it is known how to reduce the stress level of pigs in connection with the transportation to the slaughterhouse and the treatment at the slaughterhouse area, using a box which is divided into e.g. three sections with room for one animal in each section. In this way fights among the animals are prevented.

From the slaughterhouse the pig producer is provided with a number of boxes corresponding to the number of pigs which is to be delivered, and the pig producer will lead each animal into its own box section, so that they are kept separated. The filled boxes are loaded on a truck and transported to the slaughterhouse where they are unloaded. The boxes are provided with travelling wheels so that they may run on the area of the slaughterhouse. They will be connected with a conveyor which gradually pulls them towards a stunning station. Here the animals will be stunned by means of a gas while they stay in the boxes. Details about the stunning procedure are not explained in the patent specification. The stunned animals are discharged from the boxes. Having been cleaned, the boxes may be used again for the transportation and treatment of animals to be slaughtered.

It is a prerequisite for the placing of the animals in their individual sections that the producer performs the difficult work of filling the sections of the boxes. However, the pigs are unwilling to enter their own, separate sections, and it may be necessary to expose them to stress-producing means in order to get them placed. The system also involves a considerable risk that the animals will have to spend many hours in the boxes. That is not very kind to the animals, considering the cramped room.

It is also a prerequisite for the described system that quite some moving of boxes takes place between the different places, and the system requires investments in a large number of boxes. In practice it cannot replace the paternoster system being used today.

A similar system is known from DK-A 4401/71, by which a box is filled with one or more animals by the producer The boxes are transported to the slaughterhouse and unloaded on an unloading place. By means of a crane truck the boxes are moved to a stunning place where the animals are stunned in a not specified way while they stay in their boxes. When the stunned animals have been discharged from the boxes, these boxes are transported to a washing plant, and they may be used again for transportation of animals to the slaughterhouse.

This system suffers from essentially the same drawbacks as the box system described in the above Swedish patent specification. It is necessary that the producer performs the filling of the boxes, that much moving takes place between the different places, and that a large number of boxes is purchased.

By both of the box systems mentioned it is necessary to redesign the trucks considerably for the transport of animals from the producer to the slaughterhouse.

DE-A 38 17 103 describes a box-handling system which does not suffer from the last-mentioned drawbacks, since the animals to be slaughtered are being transported to the slaughterhouse in the usual way with the animals standing on the truck body. When the truck has been parked at the unloading platform, the animals are driven manually from the truck body out on to a bounded unloading platform. A number of open boxes with room for one animal in each forms the boundary at one slide of the platform. The animals are driven into the boxes, one animal in each box, and the boxes are closed. It is also a possibility that a box may contain several, separated sections, each section having room for one animal.

By means of a conveyor belt and a lowering device the boxes are conveyed one by one in a not specified way down into a stunning pit filled with carbon dioxide and then out of the pit to a transverse belt, upon which the stunned animals are discharged. The boxes are transported back to the unloading platform, so that they may be filled again with animals to be slaughtered.

The system is inapplicable in practice, as it is very difficult to get the animals into the boxes under the prevailing conditions. The animals are stressed and tired after the transportation, and furthermore, the level of stress is raised by the new surroundings at the slaughterhouse. Another problem is that the number of open boxes does not always correspond to the number of unloaded animals, so by a surplus of animals there would be animals left on the platform after the boxes have been filled, and by a deficiency of animals there would be empty boxes being run through the stunning system. This may cause reduced capacity or demand for increased speed, depending upon the number of empty boxes. No solution to the problem has been suggested. Besides, it is a prerequisite for the system that a co-ordination is made between the unloading of animals to be slaughtered and the need of the slaughter line for supply of stunned animals. The trucks for transportation of animals to the slaughterhouses must be expected to spend time waiting at the slaughterhouse.

So in practice the three box systems described above do not constitute any alternative to the paternoster system.

It is the object of the present invention to provide a stunning method which is more animal-friendly than the paternoster method being used until now. The procedure must be applicable in practice at large-scale slaughterhouses with high-speed slaughtering, and it should reduce the number of potential interruptions of work and lower the risk of deteriorated quality of meat.

More precisely, it is the objective that the animals should have the possibility of resting after the transportation to the slaughterhouse, in order to reduce the level of stress, that the instincts of the animals should be utilized as much as possible in a positive way when the animals are brought into the stunning area, and that it may be ensured that the animals will neither stay too long nor too short time in the anaesthetic atmosphere, even if minor interruptions in the pen area or stops on the slaughter line should occur.

The procedure according to the invention is characterized in that a group of at least three animals are led from the pen area of the slaughterhouse into a box with a shared, free floor area on which the animals may go about, and that a filled box is led down into the stunning pit when the need arises for stunning of animals, after which the box will be lifted up again from the pit when a predetermined stunning period of passed which causes a physiologically uniform stunning of the animals in the boxes.

The procedure according to the invention ensures a relaxed treatment of the animals, since there is not the same time pressure to drive the animals forward as is the case for the well-known paternoster system in order to keep the slaughter line going. The animals may be led into the box at a speed which is adapted to their behavior, and still the stunning may be performed at a speed which is adapted to the slaughter line, since the driving-in and the stunning of animals have been made independent of each other as far as time is concerned.

It appears that the animals are willing, under the prevailing, relatively relaxed conditions, to go into the box because of their curiosity to examine new surroundings. When the animals go around voluntarily under relaxed conditions, the dominant animal is likely to be at the front and the other animals will follow behind. By the procedure according to the invention the boxes may therefore be filled very fast so that even high-speed slaughter lines may easily be supplied from one or a few places of filling. Under the stressful and forcible conditions at well-known stunning plants the non-dominant animals of a group are most likely to be at the front, whereas the dominant animals will stay back and be difficult to drive forward.

If, by the procedure according to the invention, problems should arise for a period getting the animals into a box, the slaughter line would not be interrupted because of this, as an already filled box may be led down into the stunning pit, independent of the handling phase of boxes which are being filled. The average filling speed of the boxes is considerably higher than the prescribed speed of the slaughter line, and time lost at one box may easily be made up during the filling of the subsequent boxes. Moreover, the supply of filled boxes to the stunning pit may continue to the extent that there is a stock of already filled boxes in front of the pit.

Conversely, an interruption of the slaughter line would not have any immediate effect on the filling of animals into a box, since this may go on undisturbedly until the box is filled up.

Thus, the animals in each of the boxes which pass through the stunning pit may be exposed, at all events, to an optimum stunning as far as time is concerned, by the procedure according to the invention.

Compared to the well-known process, the procedure according to the invention provides a more animal-friendly treatment with much freer time limits for treatment of the animals, which enter the box voluntarily, and at the same time the supply of stunned animals required by the slaughter line is ensured.

The procedure according to the invention may be executed with equipment of a relatively simple construction, which also allows very different day-to-day slaughtering speeds. Because of the animal-friendly treatment and less stress among the animals, the procedure results in fewer carcasses with rind injuries and reduced meat quality. The procedure according to the invention may be fully automated, so that the use of an operator is avoided, which can improve the economy and further lower the stress level of the animals.

By the procedure according to the invention the supply of boxes to the stunning pit and the subsequent stunning treatment of the animals in the box are undependent, to a great extent, on the handling phase of the preceding and the following box. The supply and the stunning treatment are controlled by the different process parameters, such as the need for stunned animals and the current conditions of space in the stunning pit. In order to utilize this independence, the boxes used by the procedure according to the invention are preferably boxes which are not inter-connected.

The stunning pit used by the procedure according to the invention may comprise a pit designed in the ground. However, the pit may also be in the form of a case placed on the ground, which at the top is provided with holes through which the boxes are entered or removed, or it can be designed as a tunnel placed on the ground, which tunnel is provided with locks, through which boxes may be led into and out from the tunnel while the anaesthetic atmosphere is retained.

The stunning pit is preferably covered, in order to reduce the loss of anaesthetic atmosphere to the surroundings. During the operation, some of the anaesthetic atmosphere is lost and used. In order to maintain a correct atmosphere in the pit, it is preferably provided with measuring equipment and a plant to supply anaesthetizing gas, such as carbon dioxide.

A waiting area for filled boxes may be arranged in front of the stunning pit, so that a number of filled boxes may be accumulated, e.g. a sufficient number to supply the stunning pit for e.g. from 2 to 10 minutes, if the filling of boxes should temporarily be interrupted. By an embodiment of the procedure according to the invention a box is transported, after it has been filled with animals, to a waiting area at the stunning pit.

The transportation of the boxes at the slaughterhouse area is preferably made in a fully or semi-automatic way by means of already known transport methods, such as transport belts or chains, driving systems, self-propelling wagons or the like. A control system may ensure that the individual sections of the transport system are actuated or driven, so that the animals and the boxes are treated in accordance with the procedure according to the invention.

By one embodiment of the procedure according to the invention the boxes are transported in an endless transport path by means of a conveyor which is divided into sections which may be operated independently of each other, by which at least the transport of a filled box to the stunning pit and the lowering of a filled box into the pit are performed on two different, non-coupled sections, so that the lowering may take place quickly and only when it is needed.

In order to prevent the anxiety which an operator may cause among the animals, the procedure according to the invention is preferably performed in a fully automatic way by means of mechanical systems which are controlled by a resident software program.

It is particularly to be preferred that the animals are driven into the boxes in an automatic way, since the filling operation is performed much easier when there is no operator present. By one embodiment of the procedure according to the invention, animals from the pen area are automatically led into the box by means of a mechanical driving system.

In order to increase the capacity and/or to extend the period of time available for the driving operation, the plant applied may be designed to fill several boxes at the same time. There may e.g. be two to six places in the filling area to stand boxes.

Usually, the animals to be slaughtered are delivered at the slaughterhouse in the form of fairly large flocks of animals. The flocks can be separated into smaller groups, each group being driven into its own transport box. The separation may take place before the animals are stalled or when the animals are being driven out of the slaughterhouse pens, depending upon the pen facilities of the slaughterhouse.

It is an advantage if the groups are formed without the presence of an operator, as the animals are more quiet and willing to being separated. By one embodiment a flock of animals at the slaughterhouse are automatically separated into several groups of at least three animals each.

The separation of a flock of animals into smaller groups gives more flexibility in the stunning process.

In order to avoid contact between human beings and animals it is to be preferred that each group of animals is automatically led into its own box after the separation.

The separation of the animals into groups and the filling of boxes are preferably performed at the same place by placing several boxes end-to-end and sliding the end walls away, after which the animals are led into the corridor formed, and the end walls are slid back into position again.

The lowering of a box into the stunning pit is preferably started by a signal from a control unit which registers the current slaughtering speed and perhaps the number of boxes and animals which have been stunned or are being stunned. The unit may e.g. be an electronic counter which is provided with sensors located on the slaughter line and in the stunning pit to register the current need for or surplus of animals during the operation.

In the transitional area between the free atmosphere and the anaesthetic atmosphere of the pit there will always be a zone with a reduced content of the anaesthetic gas. It should be avoided that animals stay for an extended period of time in this zone, as such a stay would mean that the stunning would not be performed correctly. When the lowering of a filled box into the stunning pit has been started, the animals should quickly enter an atmosphere with a sufficiently high content of the anaesthetic gas to ensure that the stunning may start for certain. It is to be preferred that the lowering of a box into an atmosphere of carbon dioxide in the stunning pit is continued non-stop, at least down to a level where the concentration of carbon dioxide is 70% or more.

In order to achieve a quick, lethal stunning of the animals, the concentration of carbon dioxide in the stunning pit should preferably be kept at a level of 88-98%. The predetermined period of time for stunning of the animals depends on the concentration, and if required, the period of time may be regulated in accordance with the predetermined concentration in the pit, so that a correct stunning is ensured also when the concentrations vary.

The period of time passing from a box is lowered down into the stunning pit until the animals in the box are completely stunned is e.g. 2-4 minutes, depending upon the type of stunning. By so-called lethal stunning a longer period of stay in the atmosphere of carbon dioxide would be required than by ordinary stunning where the animals must be unconscious for certain when the sticking takes place. By the procedure according to the invention each box with animals to be slaughtered is led through the stunning pit within a predetermined period of time, which is preferably within the range of 1-5 minutes and especially in the range of 2-4 minutes.

By the procedure according to the invention the boxes used have room for three or more animals. Preferably, groups of 3-15 animals, and especially groups of 4-8 animals, are led into each box. The best flexibility of the process is achieved in the interval stated. The number is an average, and minor fluctuations may be tolerated in the number of animals actually present in each box. If the boxes are designed for five animals, it is acceptable, for instance, that some boxes hold four animals and other boxes six animals, since a slight overfilling will mostly affect the animals much less than if a certain system prescribing exactly five animals in each box by the filling is to be observed.

When boxes with room for e.g. 3-7 animals in each are used, space for more boxes in the stunning pit at the same time is needed, in order to provide the necessary stunning time and capacity. The boxes may be led one after the other through the stunning pit, which totally has room for e.g. 2-15 boxes.

Preferably, the boxes have a free floor area which is big enough for the animals to enter the boxes willingly. The area should also be big enough for the animals to turn around and go about fairly freely in the box. The boxes used should preferably have a floor area of not less than $0.35$ m$^2$ per pig, and preferably not less than $0.5$ m$^2$ per pig and not less than $0.7$ m$^2$ per sow and preferably not less than $1.0$ m$^2$ per sow.

In order to prevent reawakening of animals before the sticking operation and in order to avoid the development of bloody viscera by lethally stunned animals, boxes with stunned animals may be emptied of animals, immediately on leaving the stunning pit, by means of an automatic emptying device.

The animals may e.g. be discharged on to a table or a conveyor belt, from where they may be chained in the usual way by an operator and then transported further on one by one for sticking.

After the emptying, the empty box can be led to a waiting area for empty boxes. When needed, a box can be taken from this area and led to the filling area. In this way the filling operation can quickly be resumed.

The invention also relates to a plant for the stunning of animals to be slaughtered at slaughterhouses, comprising a stunning pit filled with an anaesthetic atmosphere, boxes to lead the animals through the pit and devices to empty the boxes with stunned animals and to return the empty boxes for renewed filling with animals to be slaughtered.

The plant according to the invention is characterized in that it comprises corridors which have been designed to lead animals from the pen area of the slaughterhouse into one or several boxes, that each box has a shared, free floor area for a group of at least three animals, on which area the animals may go about, and that there is a transport device to convey a filled box down into the stunning pit when there is a need for stunning of animals, and another transport device to lift it up again from the pit, after a predetermined period of time has passed which causes a physiologically uniform stunning of the animals in the box.

By means of the plant it is possible to achieve the mentioned advantages of the stunning procedure as to animal friendliness, high slaughtering speed and reduced risk of operational interruptions and reduced meat quality.

It is particularly an advantage if the boxes are not inter-connected, so that they can be moved around in a by and large independent way.

At the stunning pit there is preferably a waiting area for one or several boxes with unstunned animals, so that the lowering of filled boxes down into the stunning pit may take place even if there should be a temporary interruption of the filling procedure.

The plant according to the invention preferably comprises an endless transport path for the boxes, in the form of a conveyor which is divided into sections that can be operated independently of each other, by which at least the transport of a filled box to the stunning pit and the lowering of a filled box down into the pit are performed by two different, non-coupled sections.

The plant according to the invention is preferably provided with a mechanical driving system to lead a group of animals automatically from the pen area into a box. Each corridor may be provided with at least one travelling/elevating gate which may be moved automatically in the longitudinal direction of the corridor.

The plant according to the invention may comprise a system for automatic separation of a flock of animals into several groups of at least three animals each. The separation may take place at the unloading platform or after the animals have been stalled. In the latter case, there may—if desired—be devices to lead each group automatically into its own box, after the separation of animals.

The separation and the filling of boxes may be performed at the same place, if there is a conveyor to place several boxes end to end and devices to slide away the end walls of the boxes, so that the animals may be led into the corridor formed, and to slide the end walls back into position after the animals have been distributed on the floor area of the boxes. The plant may comprise a control unit to start the stunning procedure for a filled box which unit is designed to give a signal to start the lowering of a box down into the stunning pit and to register the current slaughtering speed and perhaps the number of boxes and animals which have been stunned or are being stunned.

The plant according to the invention preferably comprises a system too retain a concentration of carbon dioxide in the pit of 88-98%. If desired, the system may be designed to regulate the predetermined period of time for stunning of thee animals, depending upon the predetermined concentration in the pit In the plant according to the invention the boxes used will preferably have room for a group of 3-15, preferably 4-8 animals in each box.

Each box has a floor area of at least $0.35$ m$^2$ and preferably $0.5$ m$^2$ per pig and at least $0.7$ m$^2$ and preferably $1,0$ m$^2$ per sow.

The invention also relates to a system to separate a flock of animals into groups of a uniform number each. The system comprises an oblong corridor which is wide enough to allow the animals to turn around inside the corridor, and at least one transverse wall protrudes from one side wall of the corridor so far into the corridor that two animals cannot pass through the gap between the transverse wall and the other side wall of the corridor at the same time, whereas one animal has free access through the gap.

The system may be applied at the unloading area of the slaughterhouse to separate a delivered flock of animals into smaller groups before these are stalled or handled further, but it may especially be applied in connection with the separation of a flock of animals from the pen area of the slaughterhouse into smaller groups, which are to be driven into and stunned in boxes which have room for one group of animals each.

The system has proved to be able to provide the separation in a very short time, so that a supply of more than 720 animals per hour may be achieved by means of fairly simple equipment. Furthermore, the system may be automated, so that it becomes independent of operators. This contributes to an increased capacity of separation, since the animals are willing to enter the corridor of their own accord, when there are no human beings in the neighborhood.

The system according to the invention may comprise means to close the gap between the transverse wall and the other side of the corridor. It may e.g. be an arrangement to slide the transverse wall over to the other side of the corridor, or a separate sliding gate or swing gate. In this way the separation may be retained.

The transverse walls preferably protrude alternately from one or from the other side wall of the corridor. This contributes to reducing the speed of the animals, which gives a more uniform distribution of the animals in the corridor.

The floor area between two transverse walls in the corridor may be large enough to hold a group of 3-15 animals, preferably 4-8 animals. This corresponds to the preferred size of the groups which may be stunned in boxes.

The transverse walls are preferably designed with or as sliding walls, so that no extra space is required in the corridor for the operation.

In an automated system, the sliding wall may be moved, by means of a horizontal, pneumatic cylinder, between an open position, which allows passage of an animal, and a closed position, which prevents passage. The pressure of the cylinder may be adjusted, so that there is no danger of squeezing an animal.

In order to prevent that the animals may be trapped in the gap, the vertical edge of the partition wall next to the gap may be provided with a free-rolling, vertical roller.

The animals are willing to enter the corridor of the system when it is light and airy. This may be achieved if the partition wall is of a grille construction and preferably consists of vertical bars which have been fastened in a frame.

The separation of a flock of animals and the filling of boxes may be performed at the same place if the corridor is made up of several boxes placed end to end, the end walls of which boxes may be slid away so that the animals may enter the corridor which is formed when the end walls are slid away, and the animals are confined when the end walls are slid back into position.

In order to ensure the transfer of the groups from the corridor to other areas, e.g. anaesthetization boxes, the corridor may be provided with driving devices. Parallel with one side wall of the corridor, and along the wall, there may be a plate which can be moved over to the opposite side wall of the corridor. It should be possible to slide this away, so that the animals may enter the boxes.

In order to get a uniform number of animals in each group, the separation system may comprise a unit which is designed to register the number of animals in the individual areas formed between the transverse walls, preferably by means of a vision system registering the animals either by identification of their contour or by calculating the area of the animals. The unit may actuate an automatic device for the closing of the transverse walls, when there is a predetermined number of animals in the individual areas.

The invention also relates to a box to be used by the stunning of animals to be slaughtered at slaughterhouses in a stunning pit filled with an anaesthetic atmosphere. The box comprises a shared, free floor area for a group of at least three animals, on which floor area the animals may go about.

By means of the box according to the invention, a group of animals may be stunned in an animal-friendly way, as the animals will enter, together, voluntarily and of their own accord, a box with a fairly large floor area. After the filling, and without any inconvenience, the animals may remain in the box, which may be lowered down into the stunning pit in an automatic way when stunned animals are required. As the animals are treated as the flock animals they are, they will behave quietly and in a relaxed way during the filling and transportation, which will also lower the risk of stress and of a deteriorated meat quality.

The box has preferably room for a group of 3-15, preferably 4-8 animals. This gives a good flexibility as far as the filling and handling of the box are concerned.

The box has preferably a floor area of at least 0.35 m$^2$ and preferably at least 0.5 m$^2$ per pig and at least 0.7 m$^2$ and preferably 1.0 m$^2$ per sow so that the animals feel tempted to enter the box voluntarily and so that they may stay there undisturbedly for a fairly long time.

The box according to the invention is preferably designed with at least one side which may be opened, so that the animals can easily enter the box.

Preferably, at least one wall or the bottom may be opened for emptying.

The box according to the invention has preferably two walls of grille construction, so that the animals are more motivated to enter the box. Preferably, at least one side or the bottom of the box may be opened for discharge.

The procedure and the plant according to the invention are mainly used for the stunning of pigs, including sows.

Figure 2:
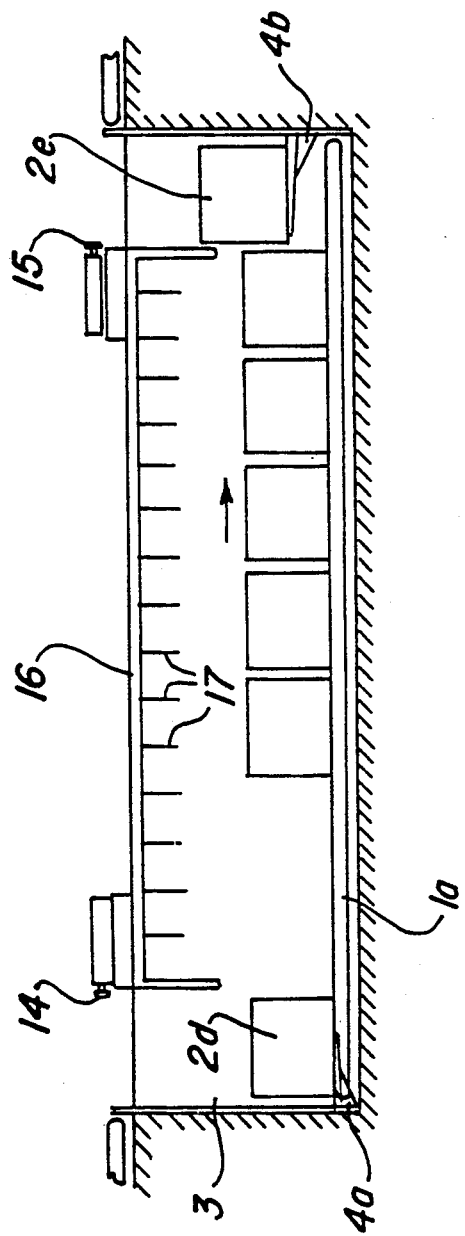

The invention is described in detail in the following, with reference to the drawings, in which FIG. 1 shows a plant for automatic separation and stunning of animals to be slaughtered, as seen from above, FIG. 2 a vertical sectional view of a stunning pit of the plant according to FIG. 1, FIG. 3 a second embodiment of a plant for separation and stunning, FIG. 4 a third embodiment of a plant, FIG. 5 a fourth embodiment of a plant, and FIG. 6 a vertical sectional view of this embodiment.

The plant in FIG. 1 includes an endless transport path 1 for boxes 2 which are designed to hold 4-6 animals at a time. The path is divided into several sections which may be operated independently of each other according to the transport pattern described below. Each section of the path is built up of two endless belts which are parallel to each other and motor driven.

One of the sections 1a (FIG. 2) of the transport path is located at the bottom of the stunning pit 3, which has an atmosphere containing carbon dioxide. At one end of the pit is a lifting arm or a conveyor system 4a to lift a box from the normal floor level of the transport path and down on to section 1a in the pit, while at the other end of the pit there is a similar device 4b to lift a box up again to the normal floor level of the transport path.

More details of the design of the plant appear from the following explanation of how it works:

An empty transport box 2a is run from an area of accumulation for empty boxes into position for receipt of animals, being automatically placed opposite one end of a corridor 5 (FIG. 1, box 2b). In the corridor there are four automatic swing-gate systems 6,7,8,9 and an elevating gate 10. Besides, there is a so-called travelling-/elevating gate which may move in the whole length of the corridor, and in the closed position it may pass by the swing-gate systems 6,7,8,9 when these are open.

At first, the swing-gate system 6 and the elevating gate 10 are open, while only the short one of the swing gates in the systems 7,8,9 is open.

A group of animals which have been stalled so that they are separated from other animals are automatically led out from the pens of the slaughterhouse. The group may e.g. comprise 15 animals. GB-A 2 211 389 describes pen facilities for group treatment of animals being received at the slaughterhouse.

Via the various driving corridors the animals finally arrive in a driving corridor 12, through which they are driven towards and into the corridor 5 by means of a travelling/elevating gate 13. The gate stops when it arrives at the position indicated by the dotted line I. Simultaneously, the gate 11 in its closed position starts moving forward in the corridor 5, so that the animals are driven forward.

The animals will also of their own accord search forward in the corridor 5 and one by one pass through the corridors which are formed by the gate systems 7,8,9, because the short swing gate is open. Each corridor is provided with a detector which registers the number of animals passing.

When five animals have passed through the gate system 9, the short gate will be closed and the elevating gate 10 will then be raised, so that the animals may go into the box 2b, one side of which is open. The gate system 8 is closed when ten animals have passed through. The travelling/elevating gate 11 stops when it arrives at the gate system 7, which means that there are now five animals in the corridor section between the gate systems 7 and 8, like in the two sections before that. The short gate in the gate system 7 is closed, and the travelling/elevating gate 11 is moved forward to a position immediately in front of the gate system 9, where the gate is lowered again. The travelling/elevating gate 11 is then run forward to a position immediately behind the elevating gate 10, after which the five separated animals are driven all the way into the box 2b.

The box is closed and transported down the transport path 1 to a section of the path which serves as accumulation for filled boxes 2c. An empty box 2a is then led from the area for empty boxes to the end of the corridor 5. During this procedure of change the gate 10 is closed and the gate system 9 is opened, so that the animals from the section between the gate systems 8 and 9 may be distributed over a larger area. The travelling/elevating gate 11 is run to a position immediately in front of the gate system 8, where the gate is lowered again.

The gate 10 is raised so that the animals may enter the box 2b, which has been placed at the end of the corridor 5, and at the same time the travelling/elevating gate 11 is moved slowly forward in the corridor. The gate system 8 is opened as soon as there is room enough. The gate 11 stops in a position immediately in front of the gate 10. The five animals have now been driven into the box 2b, which is closed and, by means of the transport path 1, transported to the area of accumulation for filled boxes 2c at the end of the line of filled boxes. The gate 10 is lowered and the gate 11, in open position, is run back to a position immediately in front of the gate system 7.

From the area for empty boxes a new box 2a is led by the transport path 1 to the end of the corridor 5, and the gate 10 is raised, so that the animals may enter the box. The gate 11 is lowered and moved forward in the corridor, driving the last five animals into the box 2b. The gate 11 stops in a position in front of the gate 10. The box is transported to the accumulation area for filled boxes 2c, the gate 10 is closed, and a new empty box 2b is placed at the end of corridor 5.

A new group of animals is guided into the corridor behind the gate system 7 by means of the travelling-/elevating gate 13. The separation of the animals into the three sections which are limited by the gate systems 7,8,9 and 10 may be started as soon as the travelling-/elevating gate 11 is moved forward from its position in front of the gate system 7 when driving the last group towards a box, the short gate in the gate system 7 being opened, so that the animals may enter the sections. When the gate 11 has passed the system 8, the long gate in this gate system is closed, and a similar thing takes place in system 9 when the gate 11 has passed this system. Therefore, the animals will have plenty of time to split up.

The travelling/elevating gate 11 is raised and moved from the position at the gate 10 back to the back position shown in FIG. 1, where it is closed.

Then, the process described above is repeated, with separation into three groups, each group being driven into its own box, and transportation of the boxes to an accumulation area on the transport path 1. All this takes place automatically in a quiet pace, which has been adapted to the natural pattern of behavior of the animals. The animals are willing to be driven into an empty box, since it is open and light. Several animals may accompany each other into the box at the same time, and the stress level of the animals is low because of the preceding, quiet treatment.

The box 2b, which is on the opposite side of the corridor 5, may be designed in such a way that it is not conspicuous from the corridor. The side can e.g. be made of vertical bars which allow light and air to enter the box.

When there is room for a box in the stunning pit 3, and when at the same time and under the prevailing circumstances a need on the slaughtering line for the animals which are to be anaesthetized may be foreseen, an automatic system takes care that a box 2c is taken from the accumulation area and via the transport path 1 is transported to the entrance area of the stunning pit. A catch 14 (FIG. 2), operated by a cylinder, pulls the box from the transport path to a device 4a, which is brought to its top position. The device is then lowered to its bottom position, which is shown in FIG. 2, which brings the box 2d down into the atmosphere of carbon dioxide, which quickly enters the box through the big holes of this, so that the stunning of the animals in the box may start immediately. In its bottom position, the device 4a places the box on the transport path section 1a at the bottom of the pit.

The transportation on the transport path may take place at an even, slow speed, so that each individual box automatically gets the same time of stay in the pit. Transportation on the transport path may also be stepwise, e.g. controlled by a counter circuit which keeps track that each box is allowed to stay for the same time in the pit. A catch device, which is placed between the two belts of the transport path, may arrange for the latest supplied box to be carried forward quickly to a preceding box, so that a close queue is formed in the pit, as shown in FIG. 2.

When the stunning period for the animals in the box is over, the box 2e is lifted up to floor level by means of the device 4b, and a catch 15 brings the box over to the transport path at the end of the pit.

During the operation, the anaesthetization pit is supplied with carbon dioxide so that the concentration of carbon dioxide in the atmosphere of the pit is kept at the desired level, e.g. 88-98%. The pit 3 may be covered by a plate 16 in order to reduce the loss of carbon dioxide to the surroundings. At the underneath of the plate are placed convection damping plates 17, the purpose of which is to damp the pumping effect which arises when the boxes are conveyed into, through, and out of the pit.

From the pit the box with the stunned animals is carried further on to a discharge device. By the veterinary regulations in force today this should happen immediately, so that there is no risk that the animals will wake up before the sticking takes place in the blood collection area. If the veterinary authorities allow so-called lethal stunning, the sticking may be delayed somewhat, since the animals cannot reawake, and a certain accumulation of boxes with stunned animals may possibly be acceptable on the transport way between the pit and the discharge device.

In the discharge device one of the belts of the path 1 is raised somewhat in relation to the other, so that the box 2f is allowed to take up an inclined position. A rail 18 prevents the box from sliding down the belts. The device is provided with a mechanism which opens one side of the box, so that the stunned animals may slide out of the box and down on to a chute 19. From the chute the animals slide over to a conveyor belt 20. An operator suspends the animals one by one in their hind legs by means of a usual chaining system. The animals are transported to sticking and debleeding by means of a conveyor 21, after which the carcasses go through the various kinds of treatment on the slaughter line at the slaughterhouse.

The emptied box is transported further down the path I and through a cabin 22, in which it is washed and cleaned. The box is then transported to the area of the path for empty boxes. From here the boxes may be transported back to the area for entering of animals, which entering takes place as explained above. This concludes the cycle of the boxes.

The separation of a number of animals into a small group of 4-6 animals and the use of the boxes to transport the groups up to and through the stunning pit bring great advantages in the form of a more animal-friendly treatment, reduced stress level, increased automation and flexibility of the plant, and uniformly performed stunning, which advantages will make themselves known at the slaughterhouses in a rational operation of the plant and an improved meat quality of the slaughtered animals.

Figure 3:
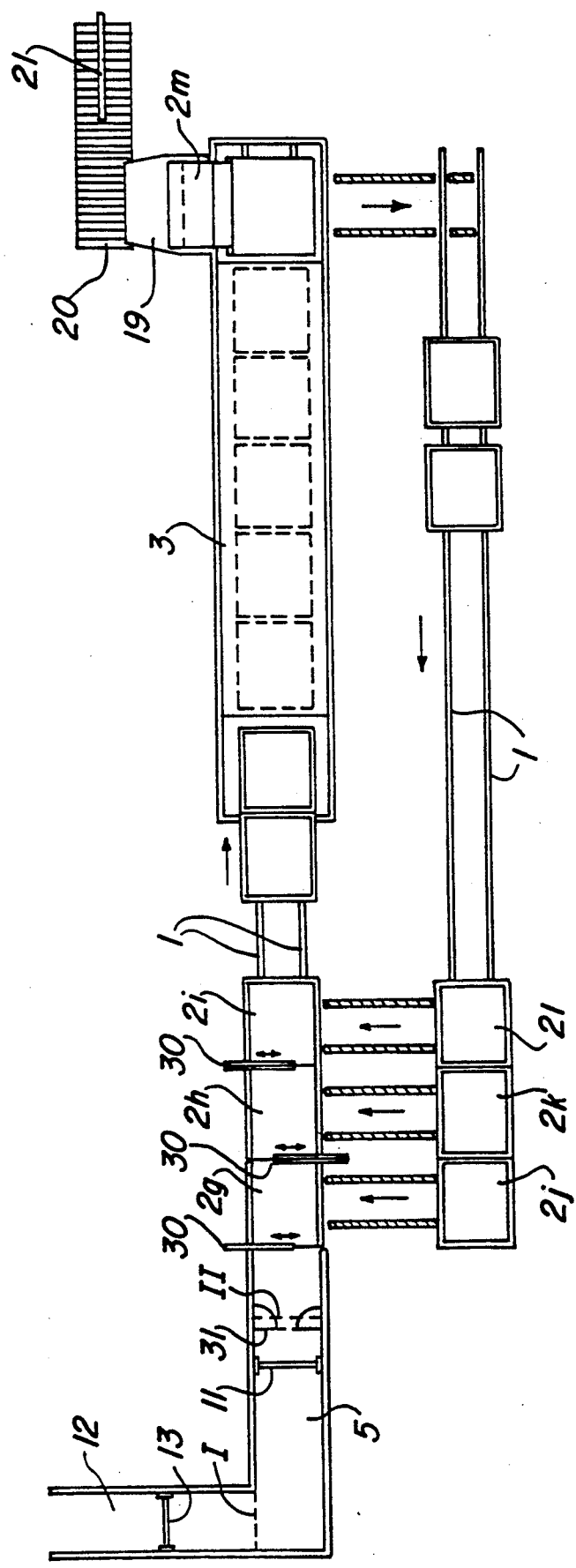

The plant according to FIG. 3 is a more compact embodiment, as a number of animals are separated into small groups by means of three transport boxes which are placed end to end. Furthermore, the accumulation area for filled boxes is smaller, as there is only room for three boxes between the filling area and the stunning area. The design of the plant appears from the following explanation of how it works.

From the pen area of the slaughterhouse a flock of animals are driven through a driving corridor 12 by means of an travelling/elevating gate 13, so that they are led to a corridor 5. When the gate 13 comes to position I, it will stop automatically.

At the end of the corridor 5 there are three boxes 2g, 2h, 2i, the two end walls of which may be moved vertically or horizontally. The boxes are placed with a small space between, allowing three sliding panels 30 to move into the corridor area formed by the boxes. In an alternative embodiment the boxes may positioned tightly, allowing one or two side walls of the box to serve as a corresponding sliding panel. Sliding may e.g. takes place by means of a pneumatic or a hydraulic cylinder.

In the initial position, each of the sliding panels has been slid about ⅔ into the corridor area. When the filling operation starts, two intermediate gates 31 are swung to the side wall of the corridor, and the end walls of the boxes are opened, except the end wall farthest away from the corridor 5. The boxes are placed on a weighing-cell system, which is connected with a control unit which may actuate the cylinders for sliding of the side walls.

The animals move forward of their own accord in the corridor 5 and into the corridor area formed by the three boxes through the narrowings at the sliding gates 30.

The weighing cells will register whether the predetermined number of animals are present in e.g. the box 2i. When this is the case, the box in question will be obstructed by sliding the sliding panel 30 fully into the corridor area by means of e.g. a pneumatic cylinder. A corresponding cylinder will then slide a box end wall into position on each side of the closed sliding panel. In the same way, the boxes 2h and 2g are closed by means of the two other sliding panels 30, when the weighing cells under these boxes register the predetermined number of animals in the boxes, and the end walls of the boxes are slid into position by means of cylinders. The sliding gate 30 between the box 2g and the box 2h is closed when the total number of animals registered in the boxes 2h and 2i is ten, no matter whether the box 2i is closed or not.

During the procedure a travelling/elevating gate 11 will move to the right from its extreme left position to position II, by which operation the animals will be led forward in the corridor 5. When the gate 11 is in position II, the sliding panel 30 at the left side of the box 2g will be pulled fully back if a signal has not been given before that the boxes 2h and 2i have been filled up. The gate 11 proceeds to the right and stops when it arrives at its extreme right position at the end of corridor 5 at the box 2g, after which the box 2g will be closed.

After the boxes have been closed, the three sliding panels 30 will be pulled back completely from the boxes, which may now be transported forward on a conveyor 1. The three boxes are moved fully three box lengths away from the corridor 5, so that the front box comes into a position where it is ready to be admitted into a stunning pit 3, which is substantially designed in and works in the same way as the one shown in FIG. 2. The box is lowered down into the pit by means of a device when there is a need for stunned animals on the slaughter line. The box is conveyed through the pit by means of a conveyor and it is lifted up to floor level again by means of a second device.

The two subsequent boxes in the waiting area are led down into the pit in the same way, when the need arises.

As soon as the three boxes 2g, 2h, 2i have been removed from the position at the end of the corridor 5, three empty boxes 2j, 2k, 2l are conveyed from the path 1 to that position.

The end walls of the boxes are slid away by the cylinders and the sliding panels 30 are slid again ⅔ into the corridor area formed. The gate 11 is raised and run back to its initial position, so that a new flock of animals may go from the driving corridor 12 via the corridor 5 and into the corridor area formed by the three boxes. The gate 11 is closed, and the procedure of driving forward a flock of animals and separation into three groups, one group in each box, may then be repeated. If there are no available boxes in position 2g, 2h, 2i, the animals would be kept back by the intermediate gates 31 which remain closed until the empty boxes are in position.

Shortly after a box has been lifted up from the pit 3, the stunned animals will be discharged from the box. The box 2m is turned around by means of a mechanism, so that the animals will slide out on to a chute 19 and then down on to a conveyor belt 20. An operator may then chain the animals in the usual way. They are transported farther on to the sticking area of the slaughter line by means of a conveyor 21.

The emptied box is turned back to its ordinary position and it is transported to a waiting area on the path 1, which is located at the boxes which are indicated by 2j, 2k, 2l. When three empty boxes have been accumulated here, they may be transferred simultaneously to the filling area at the end of the corridor 5, for separation of new animals into groups and filling of the boxes. The procedure may then be repeated.

Figure 4:
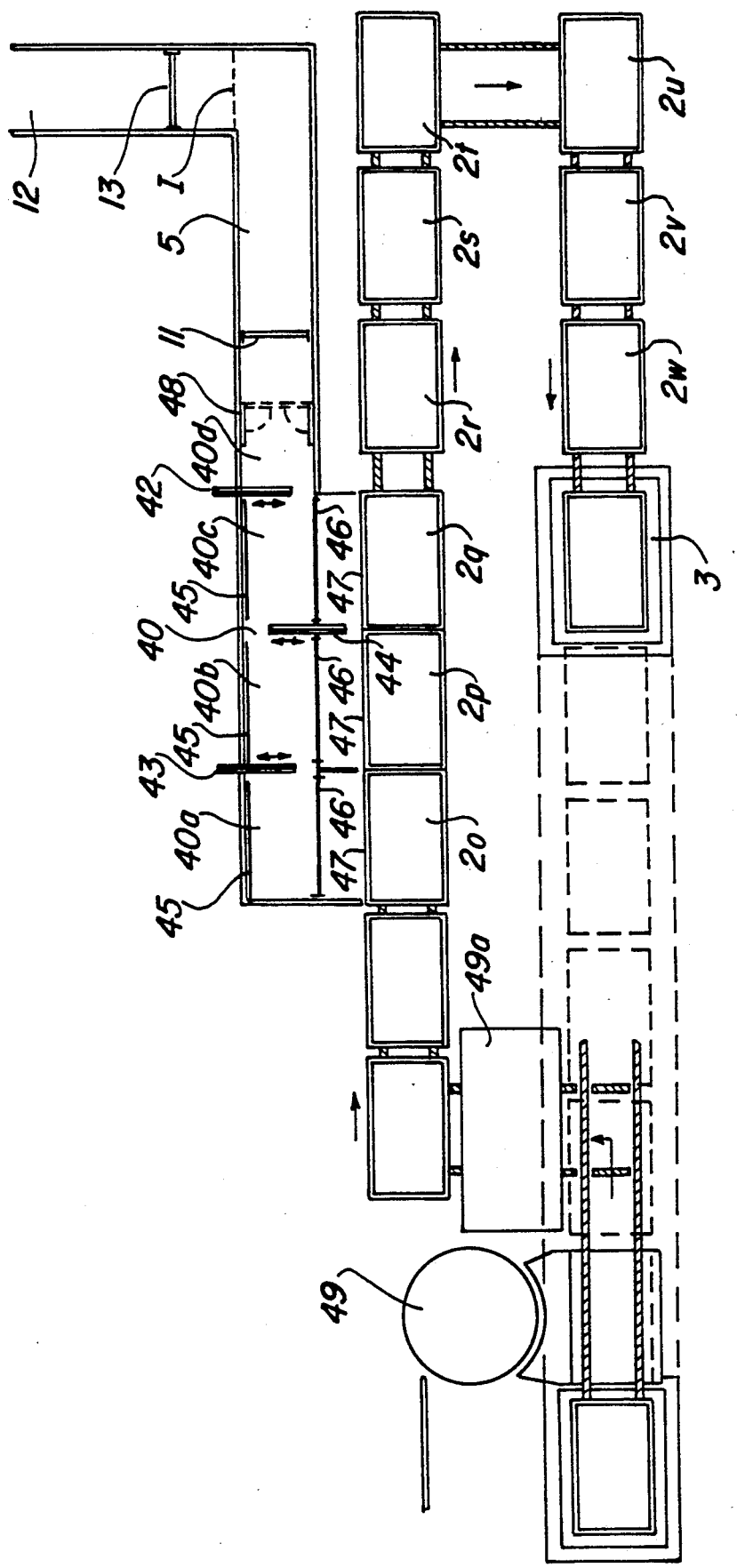

The plant in FIG. 4 has a resemblance to the compact embodiment in FIG. 3, but the separation of animals is here made in a corridor 40, designed for that purpose, which is end to end with a corridor 5 and closed by an end wall 41. The side walls of the corridor are solid and e.g. painted green or in a color which looks similar to the animals, whereas the end wall 41 consists of a frame with vertical bars placed at intervals of about 8 cm. The floor of the corridor is preferably made of concrete, with a downward gradient to a drain outside the corridor. The floor is provided with a non-skid flooring which is green. It may also be provided with transverse slits, through which dung and urine from the animals may escape.

The corridor 40 may be divided into four sections 40a–40d by means of two sliding panels 43,44 an elevating or sliding gate 42 as well as intermediate gates 48. Each sliding panel consists of a frame construction provided with vertical bars, which may automatically be moved between an open position, allowing one animal at a time to pass the construction, and a closed position, which will obstruct the corridor 40. In their open position the sliding panels will protrude about ⅔ into the corridor, so that the opening allowed for the animals will be 40-65 cm. In the closed position the opening is reduced to about 10 cm. The vertical edge of the sliding gate has a free-rolling, vertical roller, which reduces the risk of squeezing an animal when the panel is being closed.

Along one of the walls of the corridor, in each of the corridor sections 40a, 40b, 40c, there is placed a plate 45 which may be moved by means of a driving arrangement past the opposite side wall of the corridor. In the sections 40a, 40b, 40c the latter wall consists of three elevating gates 46, placed end to end, which may be raised or lowered automatically.

The boxes 2 used in this plant have a similar side wall 47, which may be raised or lowered automatically by means of a lifting device located opposite each of the sections.

More details of the design of the plant appear from the following explanation of how it works:

From the pen area of a slaughterhouse a flock of e.g. 15 animals are driven forward in a driving corridor 12 by means of a travelling/elevating gate 13. The gate stops in position I. Another travelling/elevating gate 11 leads the animals forward in the driving corridor 5 towards the corridor sections 40a–40c, in which the gates 42,43,44 protrude about ⅔ into the corridor. The intermediate gates 48 are opened, too. The animals go forward of their own accord in the corridor. Over the corridor sections there is a video camera with a computer unit which registers the number of animals in section 40a, 40b. The computer unit sends an impulse to a control unit which actuates a cylinder unit, which is connected with the sliding panel, when there are five animals in the section 40a or ten animals in both of the sections 40a and 40b, respectively. Normally, the left-hand sliding panel will close first, and then the right, but the control unit will also allow a reverse closing order.

The closing and the opening of the gates, including the intermediate gates 48, take place in a way similar to that of the embodiment according to FIG. 3. When the gate 11 has arrived at the gate 42, this will be closed. The animals have now been separated into three groups, each group in its own section 40a, 40b, 40c.

The separation of the animals into groups will take much less than one minute, so that there is sufficient capacity in this system of separation to supply a slaughter line running at a slaughtering speed of e.g. 720 pigs an hour. The gate 11 is raised and returned to its extreme right position in FIG. 4.

In the meantime, three empty boxes 2o, 2p, 2q with grille walls, at least at the long walls, have been moved by means of a conveyor to the positions shown in FIG. 4, each opposite its own section 40a, 40b, 40c. Elevating arrangements at the boxes will raise the three elevating gates 46 and the box walls 47 to a top position which allows the animals to pass from the sections 40a, 40b, 40c to the boxes 2o, 2p, 2q.

Powerful sources of light are placed over the boxes to encourage the willingness of the animals to enter the box.

The driving arrangement for the plates 45 will slowly lead the plates over past the opposite side wall of the corridor, so that it is ensured that the animals will enter the boxes completely. When this has happened, the walls 47 of the boxes will be lowered again, and the plates 45 will again be pulled over to their initial position. The gates 46 are lowered again, so that the corridor 40 is ready again to receive and separate a new flock of animals.

The boxes 2o, 2p, 2q are moved by means of a conveyor to the position indicated by 2r, 2s, 2t. From here they may be moved individually to the position 2u, 2v, 2w, immediately in front of the stunning pit 3. The boxes are led one by one down into the pit, according to the need of the slaughter line for stunned animals, just like in the embodiments according to FIG. 1-3.

When a box is down in the stunning pit, it will be conveyed through the pit and lifted up again after a predetermined stunning period, depending upon the stunning method (lethal or non-lethal) and the concentration of carbon dioxide of preferably 88-98%.

The stunned animals are discharged automatically on to a table 49, from where they may be chained for further treatment. The empty box is led through a washing station 49a and into one of the positions 2o, 2p, 2q as soon as there is room for it. In these positions three boxes may be filled again with animals which are to be stunned. The separation of animals into groups may take place independently of the supply or removal of boxes to/from the positions 2o, 2p, 2q.

Figure 5:
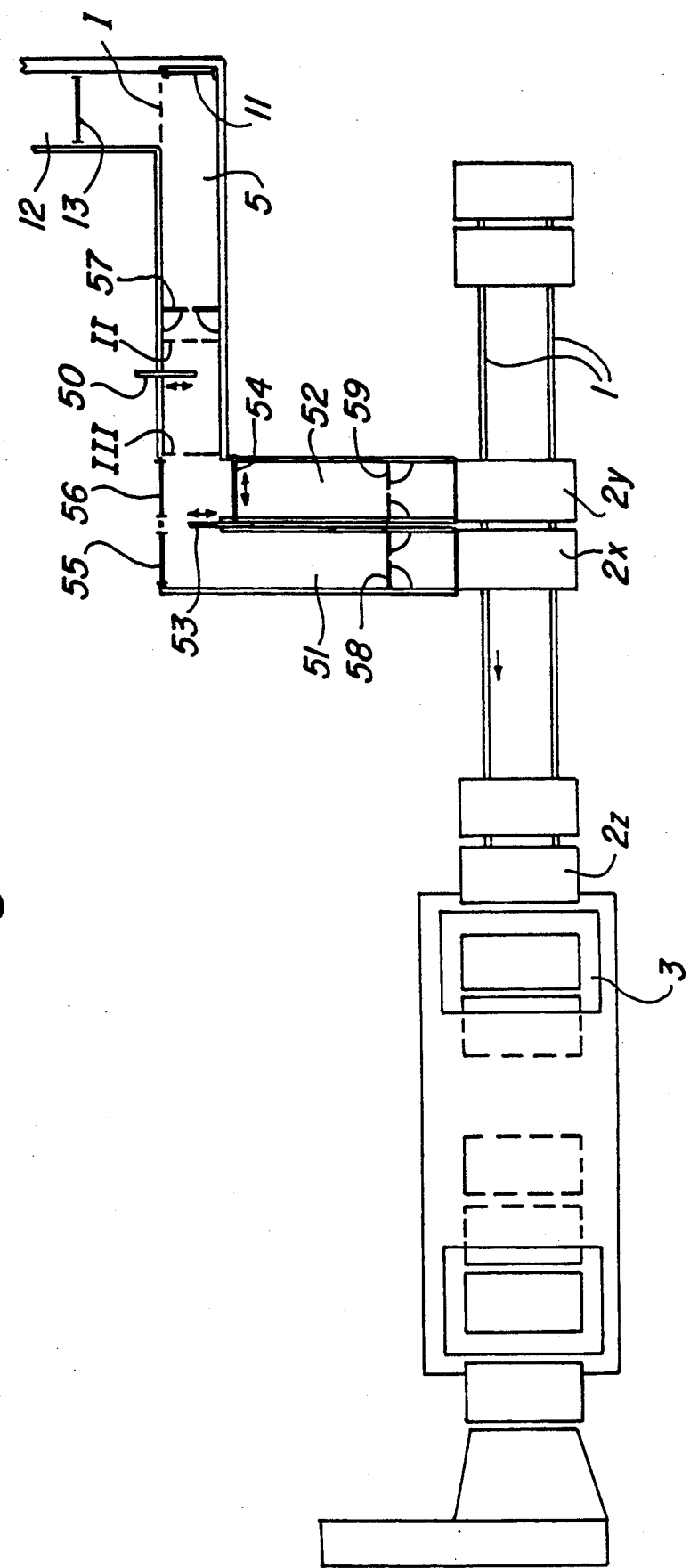

The plant according to FIG. 5 and 6 has boxes which are designed to hold 7-8 animals each. A flock of e.g. 15 animals from the pen area of the slaughterhouse may be separated into two groups of 7 and 8 animals, respectively.

The animals are driven from the pens of the slaughterhouse through a corridor 12 by means of a travelling-/elevating gate 13. It stops in position I. Two swing gates 57 in an adjacent corridor 5 are opened, as soon as two boxes have been placed into position 2x, 2y by means of a conveyor 1, and the animals are driven forward in the corridor 5 by means of a travelling/elevating gate 11. The corridor is provided with a narrowing in the form of a sliding or elevating gate 50, which protrudes about ⅜ into the corridor. For pigs the opening is about 40-65 cm. The purpose of the narrowing is to regulate the flow of forward-moving animals, reducing the speed of the fastest animals, in order to keep the flock together. The corridor 5 opens into two rooms 51,52, of which the room 51 is half closed by means of a sliding gate 53, whereas the room 52 is completely closed by a sliding gate 54.

Placed over the room 51 is a video camera, which registers animal bodies in contrast to the floor. When 7 or 8 animals have been registered in the room 51, the sliding gate 53 will be actuated, so that the room is closed automatically. The gate 54 will be opened completely, so that the animals may enter the room 52. The gate 11 is waiting in position II until the gate 54 is completely opened, and then it moves forward to position III.

The sliding/elevating gate 50 slides away from the corridor 5 when the gate 11 passes by position II. The boxes 2x, 2y, that are placed end to end with each of the rooms 51, 52 comprise each an end wall closest to the rooms, said wall is designed as a sliding or an elevating gate. Two swing gates 58,59 in the rooms 51,52 are opened, and the gates of the boxes are slid aside by means of cylinders, allowing the animals to run forward and to move so from the room into the matching box. In the rooms 51,52 there are two travelling/elevating gates 55,56, which may be moved forward to the boxes 2x, 2y automatically, so that the animals are driven all the way into the two boxes. When this has taken place, the end walls of the boxes, designed as elevating or sliding gates, are closed again.

When the gates 55,56 by their movement towards the boxes have passed the corridor 5, the gate 11 may return to its initial position, and the sliding gate 50 and the intermediate gates 57 are returned to their initial positions, after which the corridor may be used again for a new flock of animals. The travelling/elevating gates 55,56, the swing gates 51,52 and the sliding gates 53,54 are returned to their initial positions after the filling of the boxes has been completed.

The filled boxes may be transported to a waiting position 2z, from where first one and then the next may be led down into a stunning pit 3, according to the need for stunned animals, and then the treatment may take place in the same way as for the embodiments mentioned above, and when the boxes have been emptied and washed, they may be returned to positions 2x, 2y via a conveyor 1b (FIG. 6) for re-use.

We claim:

1. A method for stunning animals using a stunning pit with an anaesthetic atmosphere and a plurality of boxes having a free floor area, said method comprising the steps of: (a) leading a group of at least three animals from a pen area of a slaughterhouse into a first box; (b) moving the filled box down into the stunning pit; (c) allowing the box to remain in the pit for a predetermined period of time; (d) lifting the box out of the pit; (e) leading another group of at least three animals into a second box; (f) repeating steps (b) to (d) for said second box independently of said first box; said boxes being transported in an endless transport path by means of a conveyor which is divided into sections that may be operated independently of each other, by which at least the transportation of a filled box to the stunning pit and the lowering of a filled box into the pit are performed on tow different, non-coupled sections.

2. The method of claim 1, wherein each box, after having been filled up with animals, is transported to a waiting area proximate the stunning pit.

3. The method of claim 1, wherein an animal from the pen area is automatically led into a box by means of a mechanical driving system.

4. The method of claim 1, wherein a flock of animals at the slaughterhouse is automatically separated into several groups of at least three animals.

5. The method of claim 4, wherein each group of animals, after the separation has taken place, is automatically led into its own box.

6. The method of claim 1, wherein the lowering of a box into the stunning pit is started by a signal from a control unit, which registers the current slaughtering speed.

7. The method of claim 1, wherein a group of 3-15 animals, preferably 4-8 animals, is led into each box.

8. A plant for stunning animals to be slaughtered in a slaughterhouse, said plant comprising: a stunning pit filled with an anaesthetic atmosphere; a plurality of boxes for containing animals, each of said boxes having a floor area for at least three animals; at least one corridor for leading animals from the pen area of the slaughterhouse into one of the boxes; transport means for conveying a filled box down into the stunning pit and lifting it up from the pit; means for discharging the stunned animals from the boxes; said boxes being disconnected; said means for conveying including an endless transport path for boxes, in the form of a conveyor which is divided into sections operated independently of each other, whereby at least the transport of a filled box to the stunning pit and the lowering of a filled box into the pit are performed in two different, non-coupled sections.

9. The plant of claim 8, wherein a waiting area for one or several boxes with unstunned animals is located proximate the stunning pit.

10. The plant of claim 8, further comprising a mechanical driving system to lead a group of animals automatically from the pen area into a box, the corridor including at least one gate movable automatically and longitudinally of the corridor.

11. The plant of claim 8, further comprising a system for automatic separation of a flock of animals from the pen area into several groups of at least three animals.

12. The plant of claim 8, including means for leading, after the separation of animals, each group of animals automatically into its own box.

13. The plant of claim 8, further comprising a control unit designed to give a signal to start the lowering of a box into the stunning pit, said control unit registers the current slaughtering speed.

14. The plant of claim 8, wherein the boxes have room for a group of 3–15, preferably 4–8 animals in each box.

15. A system for separating a flock of animals into groups with a uniform number of animals in each group, said system comprising: an oblong corridor which is wide enough for the animals to turn around in; at least one transverse wall protruding from one side wall of the corridor so far into the corridor that two animals cannot pass the gap between the transverse wall and the other side wall of the corridor at the same time; and means for closing the gap between the transverse wall and the other side of the corridor.

16. The system of claim 15, wherein the transverse wall protrudes alternately from one and from the other side wall of the corridor.

17. The system of claim 15, wherein the floor area between two transverse walls in the corridor is large enough to accommodate a group of 3–15, preferably 4–8 animals.

18. The system of claim 15, wherein the transverse walls include sliding panels.

19. The system of claim 15, wherein the transverse wall is of a grille construction including vertical bars.

20. The system of claim 15, including a plurality of spaced apart transverse walls and further comprising a registration unit which registers the number of animals in each of the areas formed between the transverse walls.

* * * * *